Aug. 11, 1925.  1,549,018
J. E. NASH
SALT MANUFACTURE
Filed Oct. 19, 1923  2 Sheets-Sheet 2
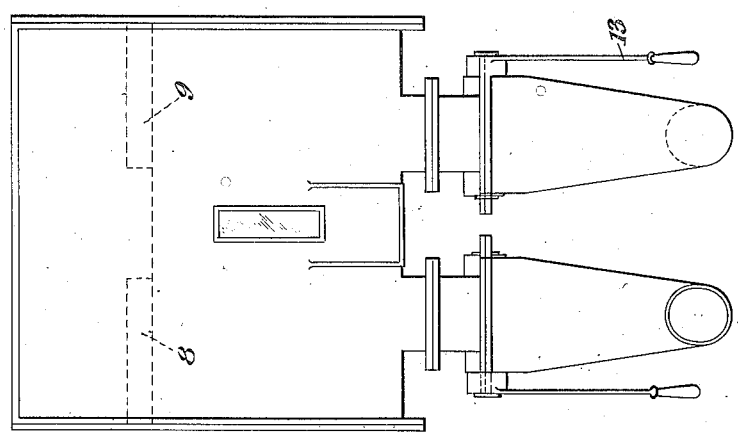
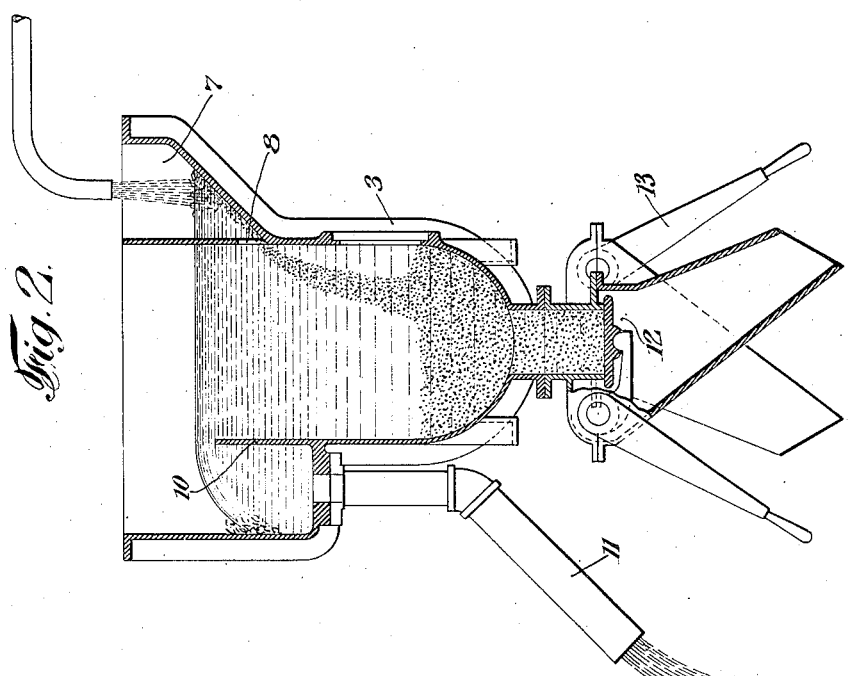

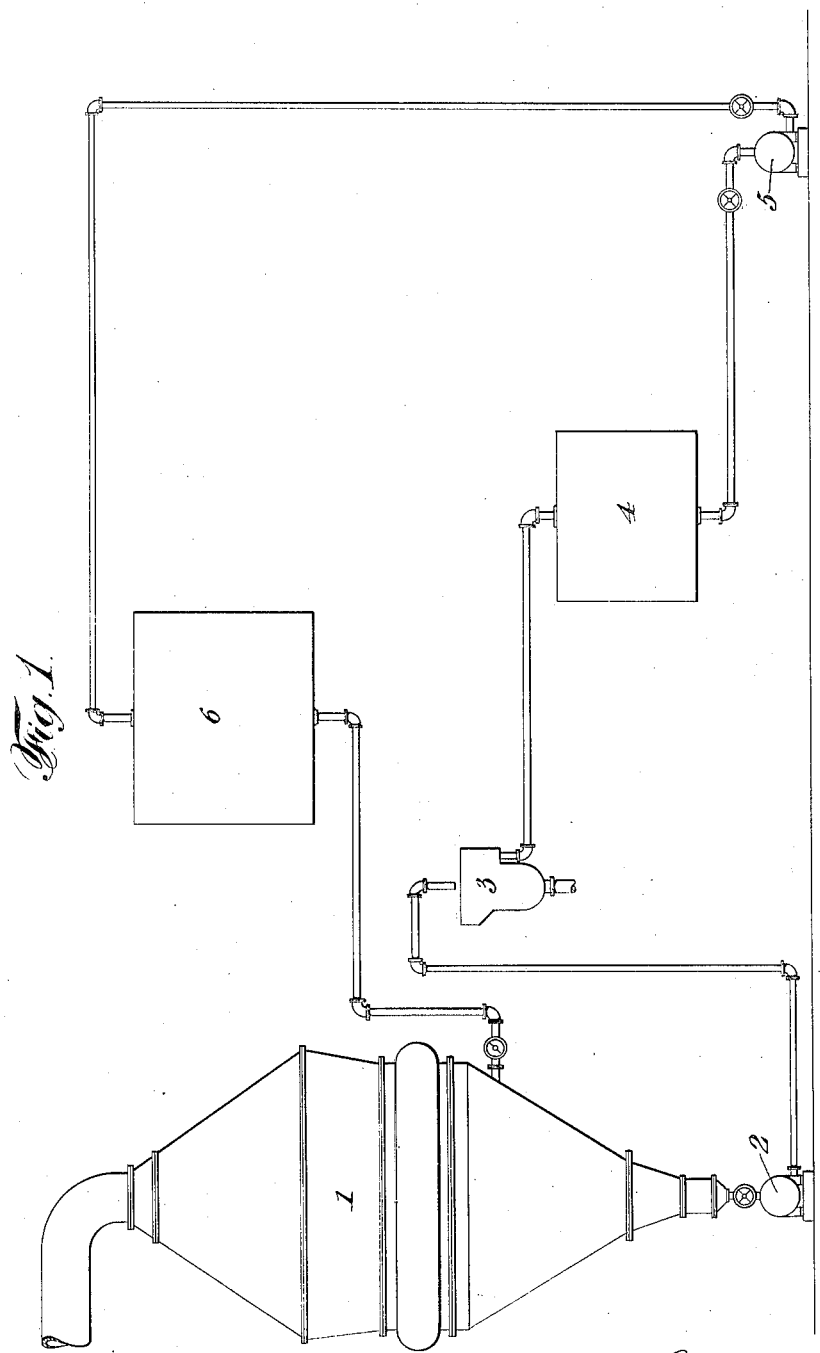

Patented Aug. 11, 1925.

1,549,018

UNITED STATES PATENT OFFICE.

JAMES E. NASH, OF SILVER SPRINGS, NEW YORK, ASSIGNOR TO WORCESTER SALT COMPANY, OF NEW YORK, N. Y., A CORPORATION OF NEW YORK.

SALT MANUFACTURE.

Application filed October 19, 1923. Serial No. 669,465.

*To all whom it may concern:*

Be it known that I, JAMES E. NASH, a citizen of the United States, a resident of Silver Springs, in the county of Wyoming and State of New York, have invented a certain new and useful Improvement in Salt Manufacture, of which the following is a specification.

This invention relates to an improvement in salt manufacture, and more particularly to a process wherein salt is obtained in relatively pure condition.

It is well known that almost all brines contain besides common salt, varying amounts of other inorganic salts chief among which are calcium sulphate or gypsum, calcium chloride, and magnesium chloride. Of the salts, the calcium and magnesium chlorides are the most soluble, particularly when their solutions are heated, and it has, therefore, been possible to crystallize out the common salt from their common solution, particularly since these chlorides are present in relatively small amounts. But in such a crystallization process a difficulty is encountered in that the calcium sulphate readily separates out from the solution and tends to deposit itself with the common salt, this difficulty being increased by the relatively large percentage of the calcium sulphate present. In processes of crystallization, therefore, the calcium sulphate has largely gone in the common salt and has constituted an impurity in the commercial product.

It is an object of this invention to obtain common salt in such a manner as to free it from impurities in general and from calcium sulphate in particular. In achieving this object it is particularly desired to operate by a process of crystallization wherein the crystals of common salt and calcium sulphate are separated. A further object of the invention is to operate by means of a continuous process and with the aid of a vacuum pan or similar device in which the brines are rapidly evaporated. Further objects of the invention will appear as the following description of the preferred embodiment of the invention proceeds.

In achieving these objects I have made the important discovery that crystals of common salt may be separated from impurities such as calcium sulphate by taking advantage of their differences in density or specific gravities and I have accordingly devised a process in which the brine, after evaporation to produce crystals, is immediately separated from the common salt crystals which are allowed to deposit by gravity. By so doing the crystals of calcium sulphate are not given time to deposit with the common salt, for they are of less density or gravity and tend to remain suspended in the mother liquor for some time, whereas the salt crystals immediately deposit. Other impurities which likewise remain suspended in the brine will be separated from the common salt in a similar manner. The process may be conducted by a variety of operative steps so that in the following description it will be understood that only a preferred embodiment of the invention is being set forth.

The accompanying drawings illustrate an apparatus which may be used advantageously in conducting the process, and in said drawings—

Figure 1 represents diagrammatically an elevation of a plant for manufacturing salt by my process;

Figure 2 represents a section of the salt separator used; and

Figure 3 represents the side view of this separator.

In said drawings there is shown an evaporator 1, which in this case is a vacuum pan, for evaporating the brine. This evaporator has connected to its bottom a pump 2 for the purpose of pumping the salt and brine out of the pan into a separator 3 wherein the salt is allowed to settle by its own gravity and the mother liquor containing the impurities is allowed to overflow into a tank 4, wherein chemicals may be introduced to effect a precipitation of impurities. A pump 5 pumps the brine from the tank 4 into a filter 6, wherein the impurities and precipitates are filtered out and from which the clear brine is pumped back into the evaporator 1, or allowed to flow back as the case may be.

Figure 2 shows the separator 3 in greater detail and it will be seen that the incoming brine falls into a small chamber 7 having openings 8 and 9 for the discharge of the salt into the bottom of the separator, while the brine passes out over the partition 10 and is discharged through the brine overflow 11. A valve 12 operable by a valve lever 13 is provided at the bottom of the separator for the removal of the salt therefrom. As shown in Figure 3 there may be two discharge valves.

In the operation of the apparatus and carrying out of the process, the crude brine is run into the vacuum pan 1 wherein it is evaporated until the common salt begins to crystalize out, which will occur in most cases before crystallization of calcium sulphate. As soon as a quantity of common salt is crystallized it is pumped out from the bottom of the pan to the separator 3. It is in this separator that the most important part of the process is conducted, for herein the salt is separated by gravity from any impurities which may be associated with it in the brine. At the beginning of the operation there will in most cases be only a crystallization of salt but as the evaporation proceeds in the pan 1 calcium sulphate will eventually begin to precipitate. It now becomes necessary to separate the salt from the calcium sulphate and this is done by taking advantage of their difference in behavior within the brine. The salt crystallizes in the form of relatively heavy crystals which tend to sink immediately, but the calcium sulphate crystallizes in minute crystals or flakes which remain suspended in the brine for a time. The process is therefore conducted to speedily remove the brine containing the impurities and calcium sulphate from the deposited salt in order to give the said impurities and calcium sulphate no time within which to deposit on this salt. The latter is, therefore, obtained in relatively pure state. In the separator as shown, the brine passes along in the form of a current and makes its exit through the pipe 11, while the pure salt is obtained through the valve 12 as it accumulates, the operator observing through an observation glass the amount of salt accumulated. After the salt is removed from the separator it may be washed to remove adhering brine and it may be centrifugalized to dry it.

The brine may, if desired, be thereupon conveyed to a chemical tank wherein a precipitation of calcium sulphate may be effected by the aid of any suitable precipitant such as barium chloride or sodium carbonate, this part of the process being optional. After this treatment, if carried out, the liquid is run into a filter tank or filter press 6, wherein all solids are removed by filtering and the clear brine is passed back into the evaporator 1 to be further evaporated in the same manner as heretofore set forth. The process may, therefore, be operated continuously, in such manner that the separator 3 is continuously receiving brine and salt and is continuously or intermittently being operated to remove the salt from the bottom thereof.

It will now be evident that the principal idea of the invention consists in concentrating or evaporating the brine to a degree where precipitation of salt and calcium sulphate occurs,—in other words, to a state of general saturation with salt and calcium sulphate,—and then removing the brine from the deposited salt before the calcium sulphate has a chance to settle upon the salt and mingle therewith. This may of course be effected in various manners, as in the present embodiment by moving the brine in the form of a current with respect to the deposited salt so that a separation will be immediately effected. The present apparatus is merely one illustration of how the process may be carried out.

It will be apparent that other impurities besides calcium sulphate lend themselves to the same treatment as long as they have the property of not depositing by gravity as soon as the common salt does. In most brines the impurities will comprise calcium sulphate very largely. In speaking of salt, common salt, that is sodium chloride, is of course meant, other salts being specifically designated. It will also be apparent that the method is not limited to the treatment of sodium chloride brines but that it lends itself also to the treatment of many other solutions containing crystallizable salts having different gravities; consequently, it is desired to distinguish in the claims between the terms "a salt" and "common salt" (NaCl).

As many apparently widely different embodiments of my invention may be made without departing from the spirit thereof, it is to be understood that I do not intend to limit myself to the embodiments described except as defined in the following claims.

I claim:—

1. The process of obtaining a relatively pure salt from a solution containing impurities comprising calcium sulphate, which comprises evaporating the solution to a state of general saturation with calcium sulphate and continuing the evaporation to precipitate salt and calcium sulphate, allowing the salt to separate out by gravity and removing the solution therefrom before the impurities can deposit with the salt.

2. The process of obtaining a relatively pure salt from a solution containing impurities comprises calcium sulphate, which comprises evaporating the solution to a state of general saturation with calcium sulphate and continuing the evaporation to precipitate salt and calcium sulphate, and causing the mixture to form a current carrying away the impurities from the salt as it deposits by gravity.

3. The process of obtaining relatively pure common salt from a brine containing impurities comprising calcium sulphate, which comprises evaporating the brine to a state of general saturation with calcium sulphate and continuing the evaporation to precipitate salt and calcium sulphate, allowing the heavier salt to separate out by gravity, and removing the brine therefrom before the impurities can deposit with the salt.

4. The process of obtaining a relatively pure common salt from a brine containing impurities comprising calcium sulphate, which comprises evaporating the brine to a state of general saturation with calcium sulphate and continuing the evaporation to precipitate salt and calcium sulphate, and causing the mixture to form a current carrying away the impurities from the salt as it deposits by gravity.

5. The process of obtaining a relatively pure common salt from a brine containing impurities comprising calcium sulphate, which comprises evaporating the brine to a state of general saturation with calcium sulphate and continuing the evaporation to precipitate salt and calcium sulphate, allowing the heavier salt to separate out by gravity, removing the brine therefrom before the impurities can deposit with the salt, filtering out the impurities, and further concentrating the brine and separating therefrom another quantity of salt.

6. The process of obtaining a relatively pure common salt from a brine containing impurities comprising calcium sulphate, which comprises concentrating the brine to a state of general saturation with calcium sulphate and continuing the concentration to precipitate salt and calcium sulphate, allowing the heavier salt to separate out by gravity, removing the brine therefrom before the impurities can deposit with the salt, chemically precipitating impurities and filtering them out, and repeating the foregoing process on the filtrate.

7. The process of obtaining a relatively pure salt from a solution containing impurities comprising calcium sulphate, which comprises continuously concentrating the solution to a state of general saturation with calcium sulphate and continuing the concentration to precipitate salt and calcium sulphate, continuously allowing the salt to separate out by gravity, and continuously removing the solution therefrom before the said impurities can deposit with the salt.

8. The process of obtaining a relatively pure common salt from a brine containing impurities comprising calcium sulphate, which comprises continuously concentrating the brine to a state of general saturation with calcium sulphate and continuing the concentration to precipitate salt and calcium sulphate, continuously allowing the heavier salt to separate out of gravity, and continuously removing the brine therefrom before the said impurities can deposit with salt.

9. The process of obtaining a relatively pure salt from a solution containing impurities, which comprises concentrating the solution to crystallize out some of the salt, causing the latter to deposit and conducting away the solution, removing the impurities from the solution, returning the purified solution at approximately the same temperature and pressure to the original solution from which the salt was crystallized, and continuing the crystallization process.

10. The process of obtaining a relatively pure salt from a solution containing impurities comprising calcium sulphate, which comprises concentrating the solution to a state of general saturation with calcium sulphate and continuing the concentration to precipitate salt and calcium sulphate, causing the salt to deposit and conducting away the solution, removing the impurities from the solution by means of a mechanical filtration returning the purified solution to the original solution from which the salt was crystallized and continuing the crystallization process.

11. The process of obtaining a relatively pure salt from a solution containing impurities comprising calcium sulphate, which comprises concentrating the solution to crystallize out some of the salt, causing the latter to deposit and conducting away the solution, removing the solid impurities from the solution, returning the purified solution to the original solution from which the salt was crystallized, and continuing the crystallization process while introducing said purified solution and agitating the liquid to make it uniform and prevent local precipitation of calcium sulphate.

12. The process of obtaining a relatively pure salt from a solution containing crystallizable impurities comprising calcium sulphate, which comprises concentrating the solution to a state of general saturation with calcium sulphate and continuing the concentration to precipitate salt and calcium sulphate, causing the salt to deposit and removing the solution therefrom before the impurities can deposit with the salt.

13. The process of obtaining a relatively pure salt from a solution containing crystallizable impurities comprising calcium sulphate, which comprises concentrating the solution to a state of general saturation with calcium sulphate and continuing the concentration to precipitate salt and calcium sulphate, and causing the mixture to form a current sufficiently strong and rapid to carry away the impurities from the salt as the latter is caused to deposit.

14. The process of obtaining relatively pure common salt from a brine containing calcium sulphate, which comprises concentrating the brine to a state of general saturation with calcium sulphate and continuing the concentration to precipitate salt and calcium sulphate, causing the salt to deposit and conducting away the solution containing calcium sulphate particles, removing the impurities and calcium sulphate from the solution, returning the purified solution to the original solution from which the salt was crystallized and continuing the crystallization process.

15. The process of obtaining a relatively pure common salt from a brine containing calcium sulphate, which comprises concentrating the brine to crystallize out some of the salt and a large proportion of calcium sulphate, causing the salt to deposit and conducting away the solution containing the particles of calcium sulphate, removing the calcium sulphate particles from the solution by a mechanical filtration, returning the purified solution at approximately the same temperature and pressure to the original solution from which the salt was crystallized and continuing the crystallization process.

16. The process of obtaining a relatively pure salt from a solution containing impurities, which comprises concentrating the solution to crystallize out some of the salt, separating the salt from the solid impurities and the mother liquor, completely removing the solid impurities to prevent recirculation thereof, and returning the liquor to the crystallization process.

17. The process of obtaining a relatively pure common salt from a brine containing calcium sulphate, which comprises concentrating the solution to crystallize out some of the salt and calcium sulphate, separating the salt from the calcium sulphate and the brine, returning the latter to the crystallization process at approximately the same temperature and pressure, and completely removing calcium sulphate particles therefrom by mechanical filtration to prevent recirculation of the particles in the process.

18. The process of obtaining a relatively pure common salt from a brine containing calcium sulphate, which comprises evaporating the brine to a state of general saturation with calcium sulphate and continuing the evaporation to precipitate salt and calcium sulphate, separating the salt from the calcium sulphate and from the brine, returning the purified brine to the process and completely filtering out the calcium sulphate particles to prevent recirculation thereof in the process.

In testimony that I claim the foregoing, I have hereunto set my hand this 16 day of October, 1923.

JAMES E. NASH.